Dec. 24, 1940.   W. J. GIBBENS, JR   2,226,463
BASKET FOR CENTRIFUGAL MACHINES
Filed March 17, 1938

Inventor
William J. Gibbens, Jr.
By Wilkinson & Mawhinney
Attorneys.

Patented Dec. 24, 1940

2,226,463

UNITED STATES PATENT OFFICE 2,226,463

BASKET FOR CENTRIFUGAL MACHINES

William J. Gibbens, Jr., New Orleans, La.

Application March 17, 1938, Serial No. 196,504

1 Claim. (Cl. 210—76)

The present invention relates to centrifugal machines, and more particularly to an improvement in baskets for use in the same.

Centrifugal machines, or extractors, are of two general types; those wherein the basket is suspended and those of the link or extractor type wherein the basket is supported from beneath and the basket is filled and emptied through its open top.

The object of the present invention is to improve the construction of baskets for use with both types of the centrifugal machines and embodies certain improvements wherein the discharge openings or passages through the exterior or wall of the basket comprises a relatively high percentage of the circumferential surface area of the basket wall.

Another object of the invention is to provide a centrifugal basket with a circumferential wall of closely spaced apart slats providing discharge passages between the slats extending uninterruptedly throughout substantially the entire length of the slats and which thus open at their inner ends against the adjacent portions of the filter plate or screen, thus permitting free discharge of the liquids to be expelled, thereby preventing clogging of the screen openings and the damming or packing of the retained material carried in the basket.

A further object of the invention is to provide a basket wall of closely spaced apart slats which are secured in a novel manner within the basket structure and interbraced between each other to hold the slats against buckling and to maintain the discharged passages of substantially uniform cross-sectional area throughout the lengths of the slats.

Numerous attempts have hereofore been made to admit the free and uninterrupted radial passage of the molasses from the sugar crystals without appreciable circumferential or circuitous travel of the molasses through the basket wall. Some of these attempts embrace coarse wire meshing spacing the liner plate from the wall of the basket but this creates tortuous passages and pockets between the liner plate openings and the perforations of the basket wall. Other means for overcoming the disadvantages are illustrated in the Roberts Patents Numbers 1,992,964, and Reissue 20,432. The tortuous passages are still present in the former patent, and the latter weakens the basket wall and obstructs numerous of the outlet openings in the basket wall.

The invention, therefore, also embodies a basket structure the circumferential wall of which is provided with uninterrupted discharge passages of suitable length throughout the height of the basket and which radially increase in cross-sectional area from the inner to the outer ends of the passages to prevent clogging of the material passing through the wall and to effect uniform drainage throughout the whole perforated area of the basket wall; to provide a basket structure wherein the discharge passages open directly and freely to the lining or screen plate used, and wherein the usual backing wire is eliminated with its disadvantages among which is the providing of added obstruction from the plate to the conventional type of round discharge holes usually found in the present used basket; to provide a basket structure wherein the discharge passages from the inner to the outer wall surfaces are so disposed as to permit the liquid expelled to travel in a radial direction through the wall without appreciable circumferential movement on the inside of the wall, excepting only on those surface portions of the vanes which support and are in contact with the filter plate or screen. Since each slot has an adjacent clear opening or channel the circumferential movement of the liquid on the inside of the basket is limited only to the width of the vanes.

With the foregoing and other objects in view, the invention will be more fully described hereinafter, and will be more particularly pointed out in the claim appended hereto.

In the drawing, wherein like symbols refer to like or corresponding parts throughout the several views, Figure 1 is a fragmentary sectional view taken vertically through a conventional type of centrifugal machine of the suspended basket type.

Figure 1:
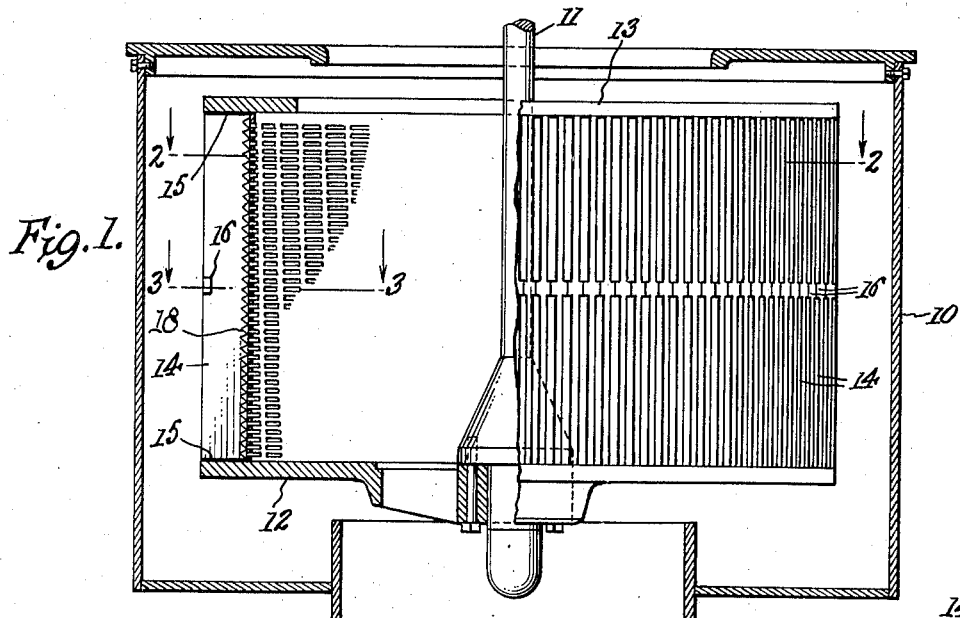

Referring now to the drawing the improved basket is shown in the present instance in a centrifugal machine of the suspension basket type wherein 10 designates the usual casing or curb which may be of any suitable or adaptable construction in which is the improved basket suspended by a spindle 11 which imparts to the basket its rotary motion and speed requisite to the work to be accomplished.

The basket is provided with a basket bottom 12, a cap 13 and an interposed side wall which comprises a plurality of slats 14 extending between the basket bottom 12 and the cap 13 and which in the present instance are shown in substantially vertical position. The slats 14 are disposed in radially edgewise position and may be secured in any suitable manner to the basket bottom 12 and cap 13, and in the present instance are shown as secured by welding 15. The slats 14 may be of the flat surface type as shown, or may be given any other suitable configuration to provide discharge passages of any suitable shape or form, and the slats 14 may be disposed otherwise than vertically as shown to determine the desired length and direction or extent of the discharge passages.

Figure 2:
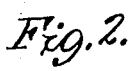
Figure 2 is a horizontal section taken through the upper portion of the centrifugal basket substantially on the line 2—2 of Figure 1.
Figure 4:
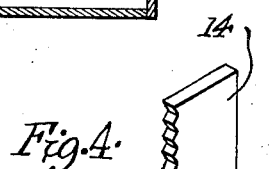
Figure 4 is a detail perspective view of the form of slat which may be used.
Figure 3:
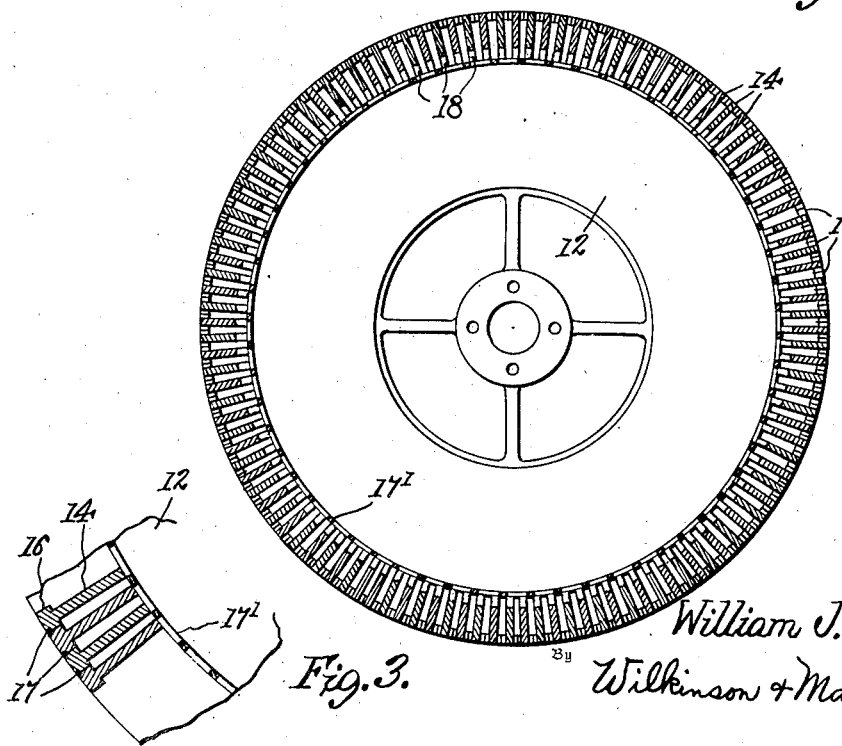
Figure 3 is a fragmentary enlarged sectional view taken through one side of the basket substantially on the line 3—3 of Figure 1.

From Figures 2 and 3, particularly, it will be noted that the edgewise radial positioning of the slats 14 provide discharge slots between the slats which increase in cross-sectional area towards their outer edges to thus prevent the stoppage or clogging up of the passages or any portions thereof and to insure that the liquid or material passing through the wall of the basket will be discharged directly and radially through the wall without substantially any deflection.

If desired, the slats 14 may be interbraced against one another at any desired number of points throughout the lengths of the slats. In the present instance each slat is provided at its outer edge portion and intermediate its ends with oppositely disposed face lugs or bosses 16, and these bosses 16 are adapted to align and abut with one another throughout the circumference of the wall and are adapted to be welded or otherwise suitably secured together, as at 17, to permanently secure the abutting bosses together and provide substantially an integral reinforcing ring about the circumference of the basket wall. Of course the bosses 16 may be disposed along the slats 14 at one or more desired points depending upon the necessary reinforcement for the basket wall. As the slats 14 are relatively thin the inner edges thereof offer little or no resistance to the passage of the material ejected from the basket but it is of course understood that the slats may be modified within the spirit of the invention to reduce any obstruction incident to the thickness of the slat.

Within the basket is disposed an inner perforated lining or plate 17' which may be of the usual construction and which, as shown, comprises a relatively thin plate or lining sheet with a plurality of holes, shown as exaggerated, therethrough and which is seated across the inner edges of the slats 14, the slats 14 forming the side wall of the basket to support the lining plate 17' in proper position. Incident to the slat construction of the basket side wall there is a greater percentage of discharge opening throughout the total surface area of the side wall of the basket as compared with the total free open area of the lining or plate 17', and this insures that at substantially all points throughout the circumference of the basket wall there is a free and unobstructed passage for the material which is discharged from the basket.

As shown in Figures 2 and 3 the inner edges of the slats 14 engage against the lining or face 17', forming a support for the same. As hereinbefore stated, the inner edges of these slats 14 are constructed or shaped to reduce frictional contact of the material passing through the lining 17'. In this instance the inner edge of the slat 14 is shown as serrated, toothed or otherwise grooved or given undulated or irregular form to provide sufficient surface support for the lining 17' but at the same time to provide a large number of adjacent passages 18 through which any of the ejected material may freely pass instead of being entrapped at the inner edges of the slats.

It is obvious that various changes and modifications may be made in the details of construction and design of the above specifically described embodiment of this invention without departing from the spirit thereof, such changes and modifications being restricted only by the scope of the following claim.

What is claimed is:

A centrifugal basket, comprising top and bottom portions and a side wall extending between said portions, said side wall comprising a plurality of closely spaced apart flat elements secured in substantially radially edgewise relation between said top and bottom portions to provide uninterrupted narrow discharge passages, the inner edges of said flat elements having toothed surfaces, and a filter lining disposed in the basket across the inner edges of said flat elements.

WILLIAM J. GIBBENS, Jr.